Sept. 25, 1928. 1,685,212
J. G. BLUNT
LOCOMOTIVE DRIVING BOX
Filed Sept. 17, 1926
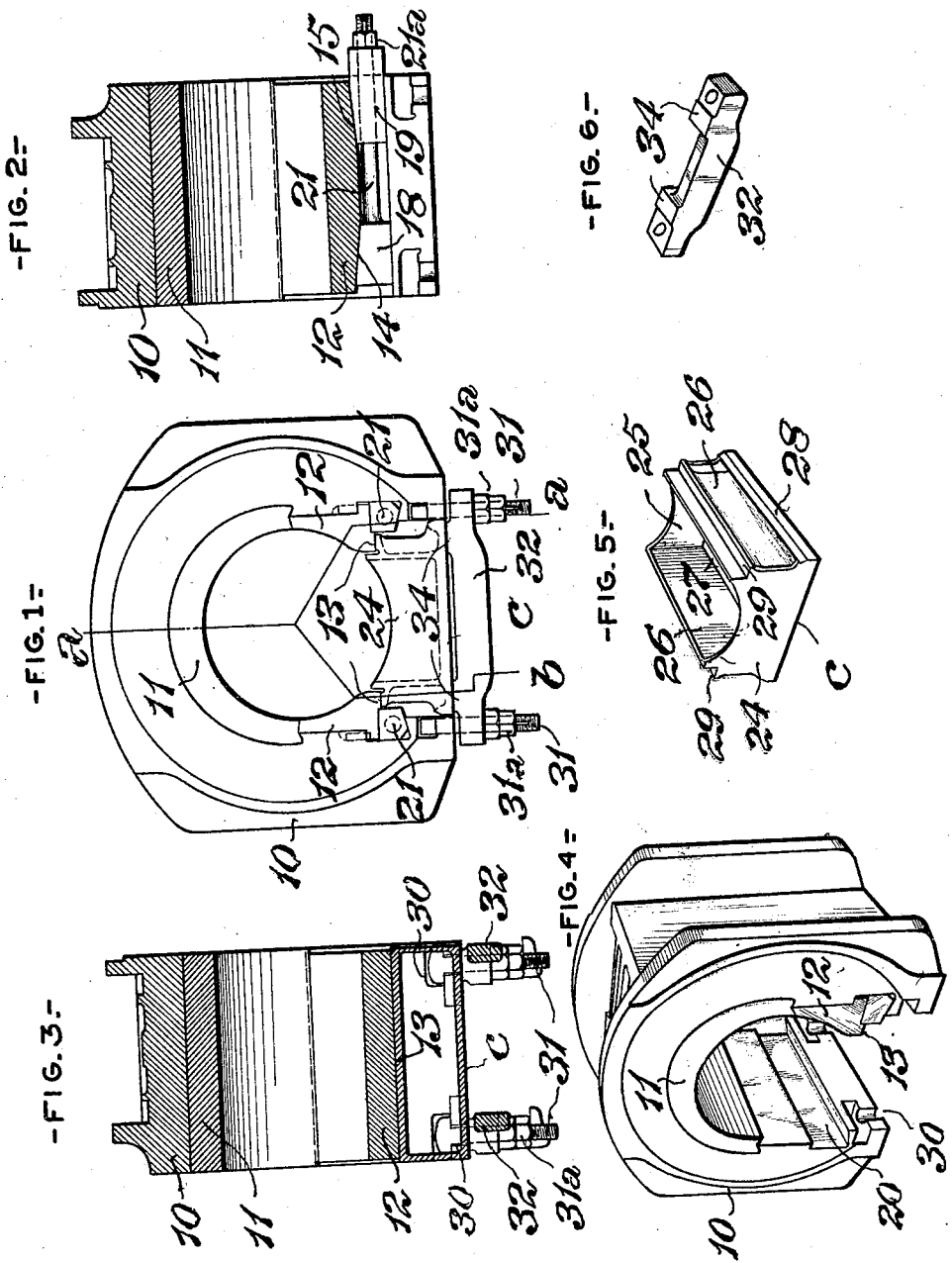
WITNESSES
INVENTOR Patented Sept. 25, 1928.

1,685,212

UNITED STATES PATENT OFFICE.

JAMES G. BLUNT, OF SCHENECTADY, NEW YORK.

LOCOMOTIVE DRIVING BOX.

Application filed September 17, 1926. Serial No. 136,059.

My invention more particularly relates to locomotive driving boxes of the general class or type in which an increase of journal bearing surface is attained by the application of supplemental bearings, fitted in the driving box below the crown brass thereof, and is an improvement upon that set forth in Letters Patent of the United States No. 1,551,496, granted and issued to me under date of August 25, 1925.

The object of my present invention is to provide a lubricant cellar, of improved construction, which will be readily insertable in, and removable from, a locomotive driving box, and which, when in operative position, in addition to acting as a lubricant container, and a strut or spreader to hold the driving box from closing in on the journal, will serve, in cooperation with the usual wedges, as a direct support for the supplemental bearings. A further object of my invention is to provide improved means for adjusting the cellar, so as to adjust the supplemental bearings to take up wear on the crown brass.

The improvement claimed is hereinafter fully set forth.

In service, there is a tendency for the main driving boxes to lift from their journals a condition which is met by supplemental bearings, located below the horizontal central plane of the journals, and having a slight clearance away from the surfaces of the journal, the amount of such clearance forming the limit of the possible rise of the boxes. Prolonged service causes wear of the crown bearings, inasmuch as the superposed load on the journals is on their vertical central line, and, in order to prevent the boxes from rising from their journals, after the crown bearings have become worn, it is necessary that the means employed to prevent the rising of the boxes, shall be adjustable throughout the allowable degree of crown bearing wear.

The application of supplemental bearings in locomotives has been found, in practice, to retard the wear of the crown bearings, and my invention is designed to provide for simple and convenient construction, installation, and adjustment of such supplemental bearings for all classes of locomotive driving boxes.

In the accompanying drawing: Figure 1 is a front view, in elevation, of a driving box, illustrating an embodiment of my invention; Fig. 2, a vertical longitudinal section, on the line $a\,a$ of Fig. 1; Fig. 3, a vertical longitudinal section, on the line $a\,b$ of Fig. 1; Fig. 4, a view, in perspective, of the driving box, with the cellar removed; Fig. 5, a similar view of the lubricant cellar; and, Fig. 6, a similar view, of one of the bars for supporting and adjusting the cellar.

In the practice of my invention, referring descriptively to the specific embodiment thereof which is herein exemplified, the driving box, 10, is provided with a crown brass, 11, and with supplemental bearings, 12, fitted in it below the crown brass. The portions, 13, of the bottoms of the supplemental bearings which adjoin the journals, are flat, and the remainder of the bottoms is formed with two oppositely inclined faces, 14, 15, which are superposed upon similarly inclined faces, on the adjusting wedges, 18 and 19, respectively. The bottoms of the wedges are inclined laterally, in correspondence with laterally inclined grooves, 20, of the driving box, in which they fit. A bolt, 21, is formed on each of the adjusting wedges, 18, said bolts passing freely through the wedges, 19, and being threaded at their outer extremities for the engagement of nuts, $21^a$, bearing against the outer ends of the wedges, 19.

In order to elevate the supplemental bearings for the purpose of taking up wear, the nuts, $21^a$, are tightened, thereby drawing the adjusting wedges together, and raising the supplemental bearing by their action thereon, until the supplemental bearings are brought into loose contact with the journal. Additional elevation of the supplemental bearings, to take up wear on the crown brass, may be effected by removing the required amount of metal from their top faces.

The lubricant cellar, indicated as a whole by the letter $c$, is preferably formed as an integral casting, and comprises a front wall, 24, a rear wall, 25, two side walls, 26, and a bottom wall, 27, having shoulders, 28, which extend beyond each of the side walls, to provide abutments adapted to prevent the box from closing in on the journal. The outer face of each of the side walls is formed with a shoulder, 29, having a flat upper face, which extends longitudinally of the wall, from end to end thereof, and is disposed a short distance below the top of the wall. The upper faces of the shoulders, 29, abut the under faces, 13, of the supplemental bearings, and cooperate with the wedges to support the supplemental bearings in proper adjusted position with relation to the crown brass. To provide for elevating the shoulders, 29, in correspondence with the adjustment of the wedges, there is provided, on the inner face of each of the four corners of the box, a recess, 30, adapted to receive the T head, and a portion of the shank, of a bolt, 31, on the bottom of the driving box, at each end whereof there is a bar, 32, which extends from leg to leg of the box, and is secured, at each end, to one of the legs, by one of the bolts, 31, and a nut, 31ª. Each bar is formed with two bosses, 34, adapted to fit between the legs of the box, and support the cellar, so that when the nuts, 31ª, are tightened, the cellar will be elevated, thus elevating the shoulders, 29, to the proper position to directly support the inner portions, 13, of the lower faces of the supplemental bearings.

In practice, when it is desired to elevate the supplemental bearings, their tops are cut away the proper amount, and then the nuts, 21ª, of the wedge bolts, are tightened, causing the wedges to raise the supplemental bearings into contact with the bottom faces of the crown brass. The nuts, 31ª, are then tightened, to raise the cellar, and thus bring the shoulders, 29, of the cellar, into proper position to act as a direct support for the inner portions, 13, of the bottom faces of the supplemental bearings.

While the lubricant cellar has been described as an integral casting, it is to be understood that the construction may be varied. Thus, for example, the end plate of the cellar may be hinged thereto, and springs employed to hold the end plate normally shut.

I claim as my invention and desire to secure by Letters Patent:

1. The combination of a locomotive driving box having a recess in the inner side face of each of its side walls; a crown brass therein; supplemental bearings, having a portion of their bottoms adapted for abutting on a supporting shoulder on the lubricant cellar, and a portion having oppositely inclined faces disposed within the recesses in the box; wedging mechanism, fitted in said recesses, below the supplemental bearings, and adjustable longitudinally to exert bearing thereon; a lubricant cellar, comprising a shoulder on each of its side walls for directly supporting a portion of the bottoms of the supplemental bearings, and means acting as a spreader for the box; and means for adjusting said cellar to effect adjustment of said shoulders to various supporting positions.

2. The combination of a locomotive driving box, having a recess in the inner face of each of its side walls; a crown brass fitted in the box; a supplemental bearing fitted in each of the recesses, and supporting the crown brass; a wedge fitted in each recess, below the supplemental bearing, affording partial support for the bearing, and adapted to effect vertical adjustment thereof; a lubricant cellar, having means affording partial support for each of the supplemental bearings, said cellar being adapted for adjustment to effect vertical adjustment of the bearings; and means for vertically adjusting the lubricant cellar.

JAMES G. BLUNT.